2,715,141

OPTICALLY ACTIVE ISOPROPYL ARTERENOL

Geza S. Delmar, Baie d'Urfe, Quebec, and Ernest Neil Macallum, Lachine, Quebec, Canada, assignors to Delmar Chemicals Limited, Lachine, Quebec, Canada, a corporation of Canada No Drawing. Application March 27, 1952,
Serial No. 278,954

4 Claims. (Cl. 260—501)

The present invention relates to the resolution of racemic isopropyl arterenol salts.

Among the large number of sympathomimetic amines related to epinephrine, isopropyl arterenol is distinguished by the fact that it is the most effective bronchodilator of the group.

While some of the sympathomimetic amines are used in the form of their optically active isomers, for example, adrenaline, in the case of isopropyl arterenol only the racemate has been used. The object of this invention is to produce optically active isopropyl arterenol salts. The advantages of such optically active isopropyl arterenol salts will become clear below.

In most cases, when it was desired to produce optically active salts and bases of this type like for instance, l-adrenaline, l-arterenol, the free base was first liberated from a racemic salt by the addition of alkali. The racemic base was separated, when necessary purified and then a salt was made by reacting it with an optically active acid like for instance d-tartaric acid. The d-tartrates of the l- and d- base respectively usually show varying solubility in some solvents and can be crystallized from their solutions as the d- base d-tartrate and l- base d-tartrate respectively.

Nevertheless, it has been found that this method of preparing the optically active isomers of isopropyl arterenol is not practical because the isopropyl arterenol base is extremely unstable and the preparation of the isomers by the above described conventional method is thus impractical because of the decomposition while passing through the stage when isopropyl arterenol is present as the free base.

Accordingly, it is an object of the present invention to provide a method for resolving the racemic isopropyl arterenol salts into their optically active components, which components have not heretofore been obtained separately without the necessity of preparing the free base.

Applicants' development

In accordance with the present invention, racemic isopropyl arterenol sulphate may be resolved by mixing together an aqueous solution of isopropyl arterenol sulphate with d-tartaric acid and reacting said mixture with a solution of barium hydroxide whereby barium sulphate is precipitated. The remaining aqueous solution is evaporated and the residue is extracted with a solvent and d-isopropyl arterenol d-tartrate is separated from l-isopropyl arterenol d-tartrate.

More specifically, the resolution of the racemic arterenol sulphate is effected by first adding a molecular equivalent of d-tartaric acid to an aqueous solution of one mole of isopropyl arterenol sulphate and reacting the mixture with a molecular equivalent of an aqueous solution of barium hydroxide whereby there is surprisingly formed a precipitate of barium sulphate rather than a precipitate of barium tartrate as one would normally expect. The amount of barium hydroxide used is sufficient to neutralize the sulfate present. After removing the precipitate there is left a solution of racemic isopropyl arterenol d-tartrate.

As can be seen this step makes it possible to transform the racemic isopropyl arterenol sulphate into the racemic isopropyl arterenol d-tartrate without passing through the isopropyl arterenol base since the reaction is carried out at a pH which is always lower than 7.

The isomers of the aqueous solution of the racemic isopropyl arterenol d-tartrate are then resolved by first concentrating the aqueous solution until a gum is obtained and taking up the gum in a solvent or solvent mixture and by fractional crystallization, separating the d-isopropyl arterenol d-tartrate and the l-isopropyl arterenol d-tartrate. The solvent preferably used is either methanol or a mixture of methanol and acetone.

The l-isopropyl arterenol tartrate may then be transformed to the l-isopropyl arterenol sulphate or chloride by reaction with either potassium sulphate or barium chloride depending on the salt desired. This reaction causes either potassium acid tartrate or barium tartrate to precipitate and upon removal of the precipitate there may be recovered the l-isopropyl arterenol sulphate or chloride.

In pharmacological experiments it was found that the l-isomer is largely responsible for the therapeutic action. For instance, it was found, that both on the blood pressure of the anaesthetized dog and on the isolated rabbit intestine, the l-isomer is approximately twice as active as the same dose of the racemate. In both of these types of tests also the d-isomer was much less active and showed only approximately 10% of the activity of the l-isomer.

Compared with the racemic compound the l-isomer seems to have a markedly increased activity, but in acute toxicity tests following intravenous injections in rats, the toxicity of the l-isomer is no greater than that of the racemate. This indicates that a smaller dosage of the l-isomer may achieve the same therapeutic effect as a larger dose of the racemic compound and at the same time the toxicity of the compound will be cut, thus resulting in a compound of increased therapeutic range and enhanced clinical usefulness.

Example

The resolution of the dl-isopropyl arterenol sulphate into its optical isomers will be more fully understood by referring to the following example.

260 gms. racemic isopropyl arterenol sulphate are dissolved in 1000 ml. water. To this solution we added 150 gms. of d-tartaric acid. Another solution is prepared by dissolving 158 gms. of barium hydroxide in 500 ml. water and this second solution is added under stirring to the first one. Barium sulphate precipitates and is filtered off. An aqueous solution of racemic isopropyl arterenol tartrate results. Evaporation of the water leaves a gummy residue, which is dissolved in methanol and subjected to fractional crystallization. The d-isopropyl arterenol-d-tartrate is much less soluble and crystallizes easily. After filtration, evaporation of the mother liquor results in a gummy substance, which is the l-isopropyl arterenol d-tartrate. Repeating this process both isomers may be obtained in the pure state. The d-isopropyl arterenol d-tartrate shows an optical rotation of $(\alpha)_{D_{25°}} + 33.44°$ in water. The l-isopropyl arterenol d-tartrate has an optical rotation of $(\alpha)_{D_{25°}} - 5.079°$ in water.

The sulphate may be obtained by reacting 28.9 gms. of l-isopropyl arterenol d-tartrate in solution with 7 gms. of potassium sulphate, filtering off the precipitated potassium bitartrate and concentrating the solution until crystals appear. The sulphate has an optical rotation of $(\alpha)^{D_{25°}} -30.24°$.

The hydrochloride of the isomer may be prepared similarly, reacting barium chloride instead of potassium sulphate with the active tartrate.

From a practical point of view the l-compound is of much more value than the d-isomer. However, the latter may be racemized or even turned into the l-isomer by using methods, which are 'per se' known in the art, like for instance by boiling solutions of the d-isomer with inorganic or organic acids for a few hours.

We claim:

1. A process for deriving a salt of l-isopropylarterenol comprising reacting a mixture of equivalent amounts of racemic isopropyl arterenol sulfate and d-tartaric acid dissolved in water with sufficient barium hydroxide to neutralize the sulfate present and form a precipitate of barium sulfate while the racemic isopropyl arterenol d-tartrate remains in solution, separating the precipitate of barium sulfate formed, and concentrating the solution of racemic isopropyl arterenol d-tartrate, resolving the concentrate by fractional crystallization from a solvent, removing the crystals of d-isopropyl arterenol-d-tartrate, concentrating the filtrate to obtain the l-isopropyl arterenol d-tartrate, and reacting said l-isopropyl arterenol d-tartrate with a salt selected from the group consisting of potassium sulfate and barium chloride to form the corresponding salt.

2. In a process for deriving a salt of l-isopropyl arterenol by reaction of equivalent amounts of racemic isopropyl arterenol sulfate and d-tartaric acid dissolved in water, the steps of carrying out said reaction in the presence of sufficient barium hydroxide to neutralize the sulfate present and form a precipitate of barium sulfate and a solution of the racemic isopropyl arterenol d-tartrate and separating from said solution the desired l-isopropyl arterenol d-tartrate in the form of a salt.

3. The process according to claim 1, in which the solvent used to resolve the racemic isopropyl arterenol d-tartrate is methanol.

4. The process according to claim 2, in which the solvent used to resolve the racemic isopropyl arterenol d-tartrate is a mixture of methanol and acetone.

References Cited in the file of this patent

UNITED STATES PATENTS

| | | |
|---|---|---|
| 1,927,961 | Stolz et al. | Sept. 26, 1933 |
| 2,276,509 | Nabenhauer | Mar. 17, 1942 |
| 2,308,232 | Scheuing et al. | Jan. 12, 1943 |
| 2,546,762 | Long | Mar. 27, 1951 |

OTHER REFERENCES

Hodgman, "Handbook of Chem. and Physics," 31st ed. (1949), pp. 408, 409 and 420–21.

Siegmund et al., Chem. Abst., vol. 41, col. 7520 (1947).